N. M. Linton,
Cage Trap.
Nº 71,188. Patented Nov. 19, 1867.
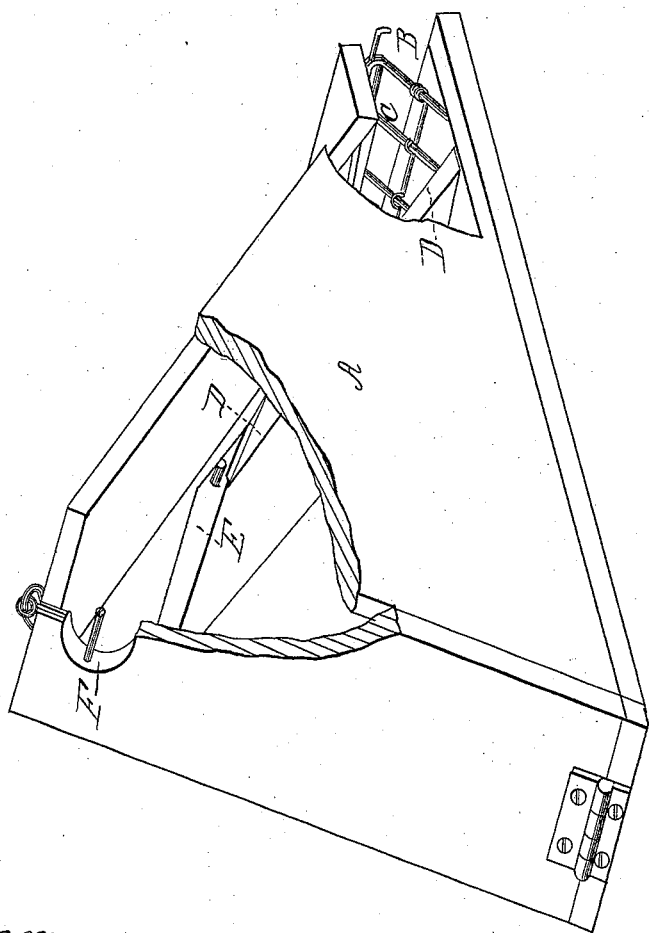
Witnesses:
Inventor
N. M. Linton
By Knight Bros
Attorneys

United States Patent Office.

NATHAN M. LINTON, OF WILMINGTON, OHIO.

Letters Patent No. 71,188, dated November 19, 1867.

IMPROVED ANIMAL TRAP.

The Schedule referred to in these Letters Patent and making part of the same.

TO ALL WHOM IT MAY CONCERN:

Be it known that I, NATHAN M. LINTON, of Wilmington, in the county of Clinton, and State of Ohio, have invented a new and useful Improvement in Rat-Traps; and I do hereby declare the following to be a full, clear, and exact description of the same, reference being had to the accompanying drawing, which is made a part of this specification.

The subject of this invention is a simple and cheap rat-trap, and one which insures the imprisonment of the game, after passing through the entrance, without the aid of springs, triggers, or such other devices as by disarrangement are constantly liable to impair the trap or render it useless.

The drawing is a sectional perspective view of a rat-trap illustrating my invention.

A represents a triangular box, having a sufficiently large entrance, B, to permit rats of any size to pass freely in. Hinged within the entrance B is a wire door, C, opening inward, but not outward. D is an inclined board, fixed within the box A, and extending upward from a point near the entrance to a point near the back end of the box A. E is a tilting-board, pivoted to the sides of the box A, and resting upon the board D, so as to form a continuation of the latter. At the upper terminus of the passage of which the boards D and E form the bottom, a wire-guarded opening, F, is formed in the back end of the box A.

In use, the rat is induced to raise the light wire door C and enter the trap, by a bait which is placed between said door and the foot of the board D. To reach the bait, the rat passes sufficiently far into the trap to clear the wire door C, and the latter then falls and shuts it in. As it cannot pass out at the entrance, the rat discovering the opening F, and seeking to escape thereby, passes up the board D and on to the tilting-board E, which deposits it into the cage or apartment G below D. The trap is then ready for another capture, without any setting or adjusting of the parts. A bait may be suspended over the tilt-board.

The trap may be of wood lined with metal, but I propose to employ any other suitable material.

Having described my invention, the following is what I claim as new, and desire to secure by Letters Patent:

The combination of the hinged door C with the parts B, D, E, F, and G, as and for the purpose set forth.

NATHAN M. LINTON.

Witnesses:
J. M. MOORE,
J. L. HACKNEY.